(12) United States Patent
Schuster

(10) Patent No.: US 6,837,264 B1
(45) Date of Patent: Jan. 4, 2005

(54) TOILET FILL VALVE WITH VALVE LOCK

(75) Inventor: Michael J. Schuster, Joliet, IL (US)

(73) Assignee: MJSI, Inc., Joliet, IL (US)

( * ) Notice: Subject to any disclaimer, the term of this patent is extended or adjusted under 35 U.S.C. 154(b) by 0 days.

(21) Appl. No.: 10/798,605

(22) Filed: Mar. 11, 2004

(51) Int. Cl.[7] .......................... F16K 31/22; F16K 31/26; F16K 35/00; F16K 35/02

(52) U.S. Cl. .................. 137/434; 137/15.26; 137/426; 137/436; 137/437; 137/444; 251/90; 251/95

(58) Field of Search ................ 137/15.26, 436, 137/437, 410, 416, 421, 426, 434, 442, 443, 444; 4/324, 366, 415; 251/90, 95

(56) References Cited

U.S. PATENT DOCUMENTS

| | | | |
|---|---|---|---|
| 2,512,176 A | 6/1950 | Shaffer | 137/390 |
| 2,791,235 A | 5/1957 | Smith | 137/437 |
| 3,040,769 A * | 6/1962 | Lamb | 137/420 |
| 3,457,947 A * | 7/1969 | Fitzgerald | 137/418 |
| 3,986,216 A | 10/1976 | Davis et al. | |
| 3,994,628 A | 11/1976 | Kemper | |
| 4,007,498 A | 2/1977 | Pearson | |
| 4,017,916 A | 4/1977 | Pearson | |
| 4,032,822 A | 6/1977 | Un | |
| 4,090,532 A | 5/1978 | Story, Jr. | |
| 4,145,775 A | 3/1979 | Butler | |
| 4,351,071 A * | 9/1982 | Clar | 4/324 |
| 4,392,260 A | 7/1983 | Bensen | |
| 4,420,845 A | 12/1983 | Antunez | |
| 4,700,413 A * | 10/1987 | Lopez | 4/324 |
| 4,707,867 A | 11/1987 | Kawabe et al. | |
| 4,764,996 A | 8/1988 | Pino | |
| 4,770,388 A | 9/1988 | Carman | 251/195 |
| 4,793,588 A | 12/1988 | Laverty, Jr. | |
| 4,918,764 A | 4/1990 | Haselswerdt et al. | |
| 4,980,932 A | 1/1991 | Stemples | |
| 5,007,452 A | 4/1991 | Antunez | |
| 5,036,553 A | 8/1991 | Sanderson | |
| 5,052,060 A | 10/1991 | Makita et al. | |
| 5,083,323 A * | 1/1992 | Cannan | 4/415 |
| 5,134,729 A | 8/1992 | Shaw | |
| 5,232,011 A * | 8/1993 | Royalty | 137/410 |
| 5,245,710 A | 9/1993 | Haselswerdt et al. | |
| 5,327,931 A * | 7/1994 | Royalty et al. | 137/410 |
| 5,362,026 A | 11/1994 | Kobayashi et al. | |
| 5,432,959 A | 7/1995 | Ellsworth et al. | |
| 5,442,820 A * | 8/1995 | Becker | 4/415 |
| 5,469,586 A | 11/1995 | Tsutsui et al. | |
| 5,542,448 A * | 8/1996 | Campbell et al. | 137/410 |
| 5,708,991 A | 1/1998 | DeMarco | |
| 5,715,860 A | 2/1998 | Horad | |
| 5,742,951 A * | 4/1998 | Wright et al. | 4/381 |
| 5,775,366 A * | 7/1998 | Ray et al. | 137/410 |
| 6,202,227 B1 | 3/2001 | Gurowitz | |
| 6,209,576 B1 | 4/2001 | Davis | |
| 6,263,519 B1 | 7/2001 | Parsons et al. | |
| 6,560,790 B2 | 5/2003 | Saar et al. | |
| 2002/0092090 A1 | 7/2002 | Johnson | |
| 2002/0162166 A1 | 11/2002 | Saar et al. | |

* cited by examiner

Primary Examiner—George L. Walton
(74) Attorney, Agent, or Firm—D'Aurelio & Mathews (57) ABSTRACT

Various toilet valves and methods are described that provide for locking of the toilet filled in a closed state. In one embodiment, a toilet fill valve is provided having an actuating arm. The toilet fill valve is closed when the actuating arm is disposed in a first position and is open when the actuating arm is disposed in a second position. A valve lock is attached to the actuating arm. The valve lock includes an unlock position and a lock position. The valve lock fixes the actuating arm in the first position when the valve lock is in the lock position.

16 Claims, 7 Drawing Sheets

Figure 1:
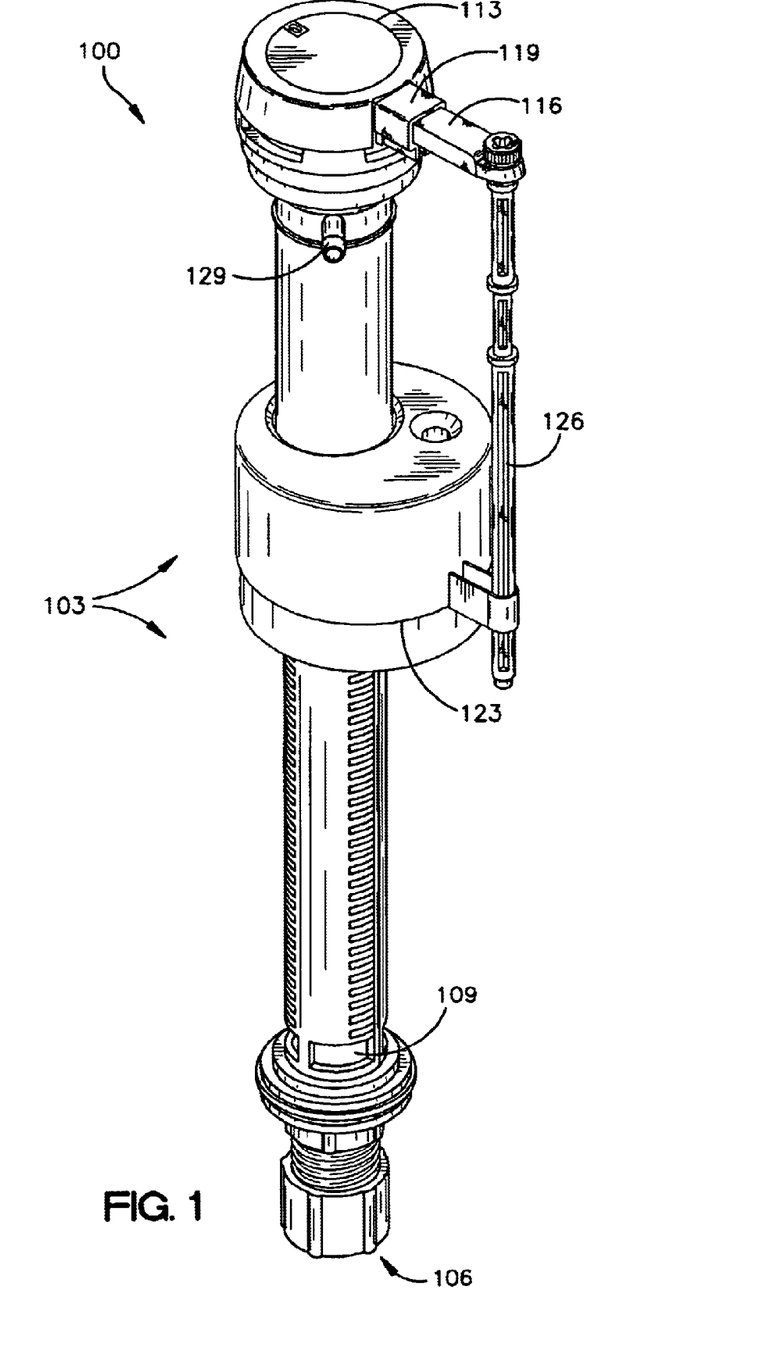

TOILET FILL VALVE WITH VALVE LOCK

BACKGROUND

From time to time, the components within a toilet tank may need adjustment or replacement. For example, various components within a toilet tank such as a flapper, handle chain/linkage or other components may leak or malfunction in some other manner. In many situations, a leak may result in a significant waste of water. In order to replace or fix such components, an individual may have to drain the toilet tank itself to work on the normally submerged components. However, the moment that the water level drops in a typical toilet tank, a fill valve is opened and water flows into the tank in order to refill the tank for the next flush. Consequently, to stop the flow of water into the tank, an individual typically locates a shut-off valve that is outside the toilet tank near where the water supply is supplied into the tank.

However, in the typical case, such a shut-off valve may not have been operated for years. In many situations, this means that shut-off valves often fail to work. Thus, to shut off the flow of water to the toilet tank in order to perform the desired maintenance, the individual often locates the main water shut-off valve in the entire dwelling or other building to shut the water off at such a point. Once the water has been shut off, then maintenance can be performed within the toilet tank after water is drained as no further water will flow back into the tank. After malfunctioning or old components have been maintained or replaced in the toilet tank, then the individual can manipulate the main water shut-off valve in the dwelling or other building to reestablish water pressure in the dwelling or other building.

Since the toilet tank is empty when the water is turned back on, a typical fill valve in the toilet is in an open state. Consequently, the first component within the dwelling or building that typically calls for water after the water pressure is reestablished is the fill valve within the empty toilet tank. When the water pressure was shut off within the dwelling or other building, the pressure may drop goes 50 psi to psi. When the pressure is reestablished by turning on the main valve, then the pressure goes back from 0 psi to 50 psi. These abrupt changes in the pressure within the piping system of a dwelling or other building typically disturb sediment and rust that has accumulated inside the walls of the pipes. Since the fill valve is usually the first thing to call for water when water pressure is reestablished, all of the rust and sediment that has loosened due to the pressure changes in the pipes heads directly for the fill valve. This sediment and rust can lodge itself within the fill valve, creating leaks and other problems.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 1 depicts perspective view of a toilet fill valve according to an embodiment of the present invention;

FIGS. 2A and 2B depict a side view of the toilet fill valve of FIG. 1 in both an open state and a closed state according to an embodiment of the present invention;

FIGS. 3A and 3B depict a top of the toilet fill valve of FIG. 1 in which a valve lock is in an unlock position according to an embodiment of the present invention;

FIGS. 4A and 4B depict a top of the toilet fill valve of FIG. 1 in which a valve lock is located in a lock position according to an embodiment of the present invention;

FIGS. 5A and 5B depict a first locking arrangement employed in the fill valve of FIG. 1 to hold a valve lock in an unlock position according to an embodiment of the present invention;

FIGS. 6A and 6B depict a second locking arrangement employed in the fill valve of FIG. 1 to hold a valve lock in an unlock position according to an embodiment of the present invention;

FIGS. 7A through 7C depict an alternative valve lock according to an embodiment of the present invention; and FIGS. 8A through 8C depict an additional alternative valve lock according to an embodiment of the present invention.

DETAILED DESCRIPTION

With reference to FIG. 1, shown is toilet fill valve 100 according to an embodiment of the present invention. The toilet fill valve 100 includes a valve body 103 that extends from a water inlet 106 up to a top of the toilet fill valve 100. The toilet fill valve 100 also includes a water outlet 109 that allows water to flow into a toilet tank when the toilet fill valve 100 is installed. The toilet fill valve 100 may be, for example, a pilot style fill valve. However, it is understood that the toilet fill valve 100 may be any style of fill valve such as, for example, a ballcock valve, etc.

At the top of the toilet fill valve 100 is a cap 113 that covers various valve apparatus within a top portion of the toilet fill valve 100. The toilet fill valve 100 also includes an actuating arm 116. Disposed on the actuating arm 116 is a valve lock 119 that slides along a longitudinal length of the actuating arm 116. In this respect, the valve lock 119 is attached to the actuating arm 116 in a manner that facilitates the sliding of the valve lock 119 from a lock position to an unlock position as will be described. The cap 113 includes an opening through which the actuating arm 116 extends. In one embodiment, at least a portion of the valve lock 119 extends through the opening when in the lock position.

The toilet fill valve 100 further includes a float 123 that moves up and down the body 103 of the toilet fill valve 100. A translating arm 126 operatively couples the float 123 to a free end of the actuating arm 116. The toilet fill valve 100 also includes a bowl fill outlet 129 that supplies an amount of water to refill a toilet bowl after a flush cycle as can be appreciated by those with ordinary skill in the art.

Next, the operation of the toilet fill valve 100 is described. The toilet fill valve 100 is typically installed within a toilet tank of a toilet. When such a toilet is flushed, water drains from the toilet tank and the float 123 falls with the level of the water. Due to the fact that the float 123 is operatively coupled to the free end of the actuating arm 116 by way of the translating arm 126, the free end 116 of the actuating arm falls with the float 123. In this respect, the actuating arm 116 pivots about a fixed axis where the actuating arm 116 is attached to the toilet fill valve 100 underneath the cap 113. The motion of the actuating arm 116 in this respect causes the toilet fill valve 100 to open, thereby causing water to flow from the water inlet 106 out of the water outlet 109 to refill the toilet tank. In addition, water flows out of the bowl fill outlet 129 and is typically routed to an overflow tube within the toilet tank to the toilet bowl to refill the toilet bowl during a toilet flush cycle.

Thus, the actuating arm 116 is capable of moving from a first position in which the toilet fill valve 100 is closed to a second position in which the toilet fill valve 100 is opened in order to allow water to flow into the toilet tank. The valve lock 119 may be positioned in either a lock position or an unlock position along the actuating arm 116. With reference to FIG. 1, the valve lock 119 is located in the lock position. In this respect, a portion of the valve lock 119 is pinched between the bottom of the actuating arm 116 and a rim (not shown) around the top of the toilet fill valve 100 underneath the cap 113. By virtue of the fact that the valve lock 119 is pinched between the actuating arm 116 and the rim, the actuating arm 116 is prevented from dropping as the float 123 drops when the water level falls in the toilet tank. Since the free end of the actuating arm 116 is prevented from dropping when the water level in the toilet tank falls, the toilet fill valve 100 remains in a closed state. Consequently, water is not allowed to flow back into the toilet tank as will be described.

Since the valve lock 119 may be placed in the lock position, thereby maintaining the toilet fill valve 100 in a closed state, water can be removed from the toilet tank without water flowing into the tank through the water outlet 109, thereby allowing a user to perform any needed maintenance in an empty toilet tank without having to shut the water off at another point in a dwelling or other building.

In addition, the valve lock 119 slides from the lock position as shown in FIG. 1 to an unlock position, thereby facilitating normal operation of the toilet fill valve 100. Specifically, when in the unlock position, the valve lock 119 does not restrict the movement of the actuating arm 116 and allows the actuating arm 116 to drop with the float 123, thereby allowing the toilet fill valve 100 to open when the water level of the toilet tank falls.

Figures 2A, 2B:
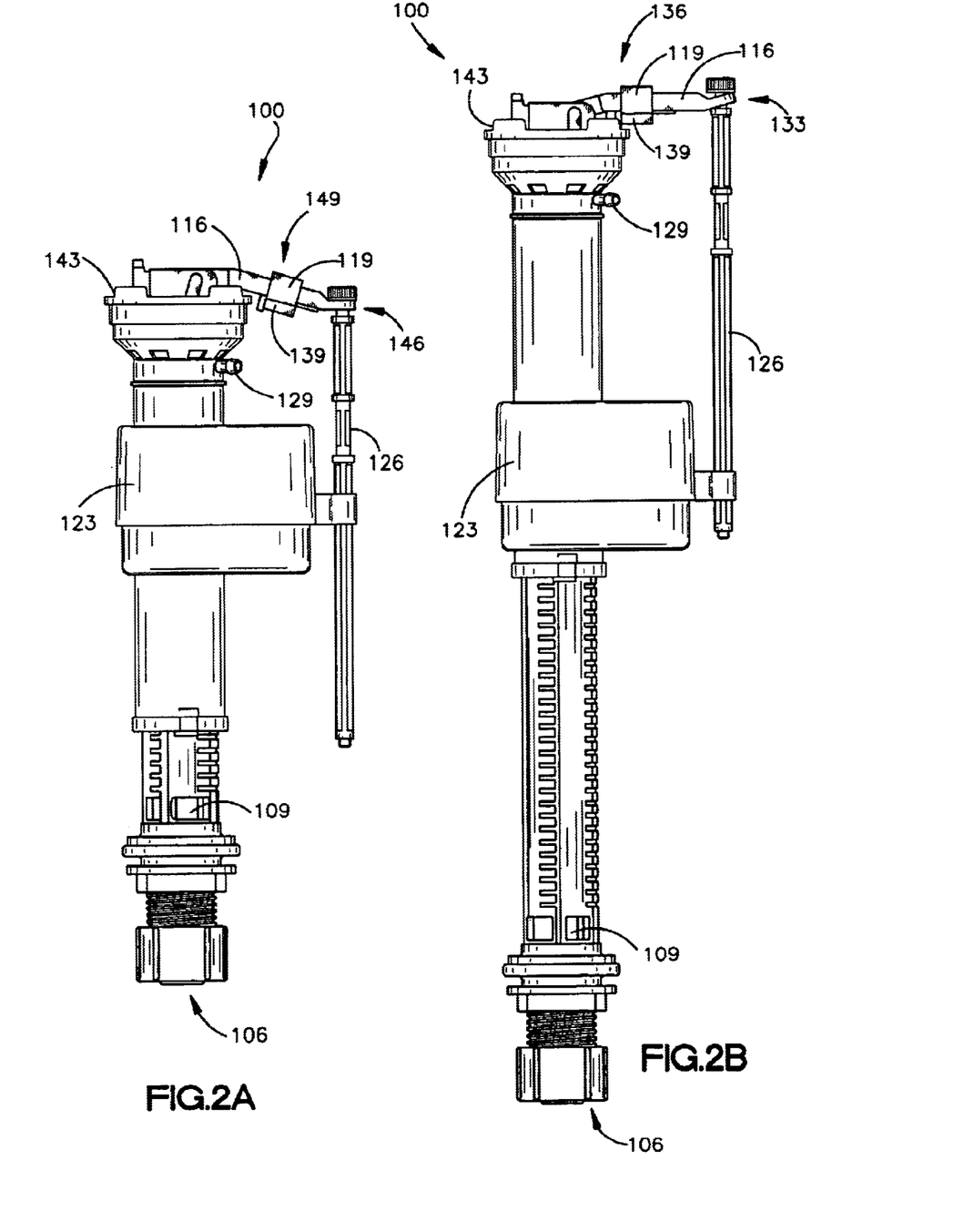

With reference to FIGS. 2A and 2B, shown are side views of the toilet fill valve 100 that illustrate the toilet fill valve 100 in both an open state and a closed state as will be described according to an embodiment of the present invention. Specifically, with reference to FIG. 2B, the actuating arm 116 is shown in a first position 133 and the valve lock 119 is in a lock position 136. In this respect, the free end of the actuating arm 116 is raised to a maximum height, where the actuating arm 116 pivots about the opposite end. Consequently, the toilet fill valve 100 depicted is closed and water does not flow out of the water outlets 109 to fill the toilet tank. As depicted in FIGS. 2A and 2B, the valve lock 119 includes an extended portion 139 that is wedged between the actuating arm 116 and a rim 143 around a top portion of the toilet fill valve 100. As shown in FIG. 2B, the valve lock 119 is in the lock position 136 such that the extended portion 139 is wedged between the actuating arm 116 and the rim 143.

In FIG. 2A, the toilet fill valve 100 is depicted in an open state. In this respect, the actuating arm 116 is in a second position 146 in which the free end of the actuating arm 116 is lowered. This is due to the fact that a level of water in the toilet tank has dropped down such that the float 123 has fallen, thereby allowing the free end of the actuating arm 116 to fall to the second position 146, the actuating arm 116 pivoting about a pivot point at the end opposite the free end. The valve lock 119 is shown in an unlock position 149. In the unlock position 149, the valve lock 119 does not engage the rim 143 of the toilet fill valve 100 as shown. In this respect, the actuating arm 116 may move freely during the course of the operation of the toilet fill valve 100. In this respect, the toilet fill valve 100 operates in a normal manner.

Figure 3A:
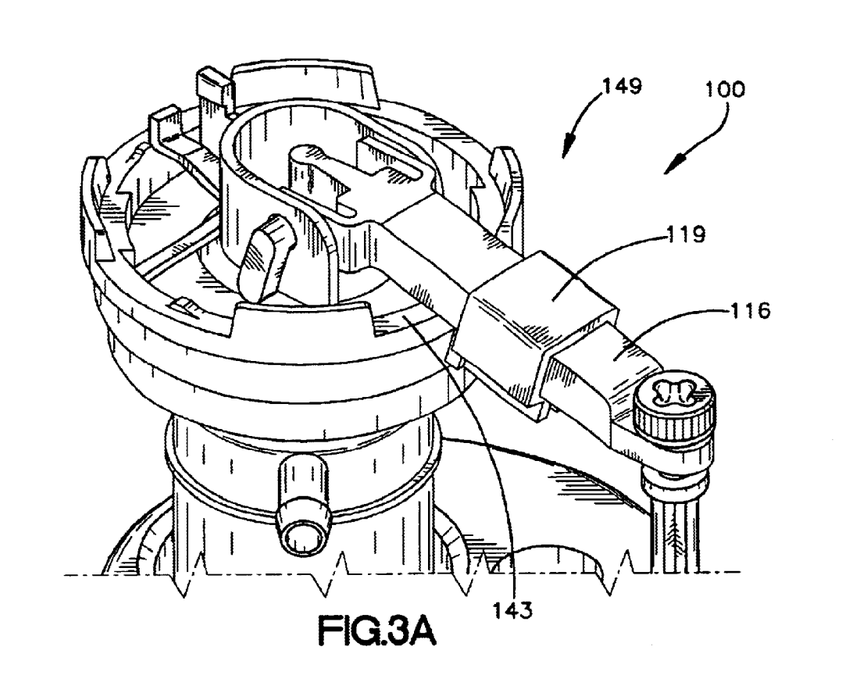
Figure 3B:
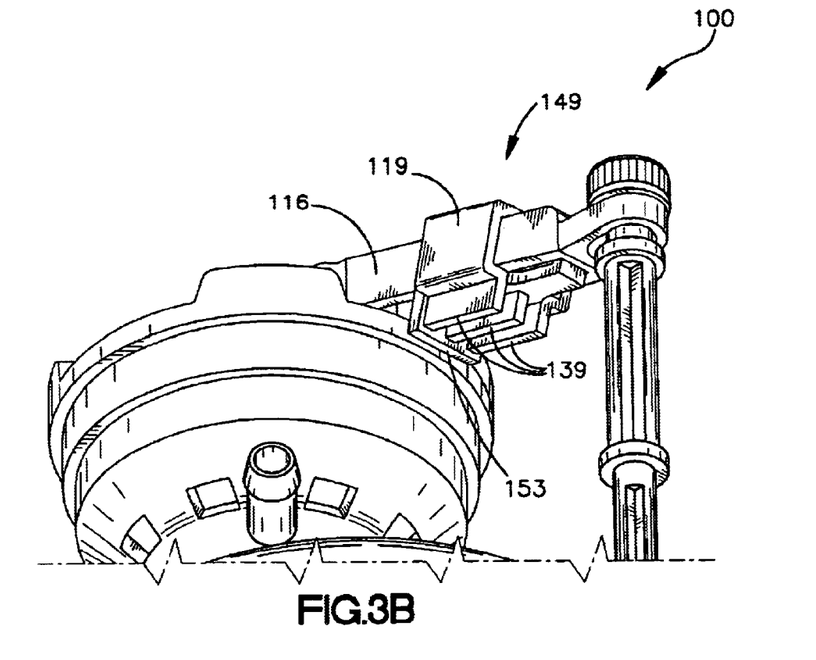

With reference to FIGS. 3A and 3B, shown are views of a top portion of the toilet fill valve 100 in an open state as was depicted with reference to FIG. 2A according to an embodiment of the present invention. As shown, the valve lock 119 is in the unlock position 149. As such, the actuating arm 116 is able to fall, thereby opening the toilet fill valve 100. As shown, the valve lock 119 includes the extended portion 139. In one embodiment, the extended portion 139 further comprises a number of ribs that extend orthogonally from the bottom of the valve lock 119. Alternately, the extended portion 139 may be a solid portion as opposed to using the ribs as shown. In this respect, the extended portion 139 provides for structure that is pinched between the bottom of the actuating arm 116 and the rim 143 when the valve lock 119 is placed in the lock position 136.

The valve lock 119 also includes a retaining lip 153 that engages the rim 143 when the valve lock 119 is placed in the lock position (not shown). In this respect, the retaining lip 153 ensures that the valve lock 119 stays in the lock position as it butts up against the rim 143 preventing the valve lock 119 from sliding down the actuating arm 116, thereby allowing the actuating arm 116 to be released and to fall, thereby opening the toilet fill valve 100 and filling the toilet tank (assuming that the toilet tank is empty).

Figure 4A:
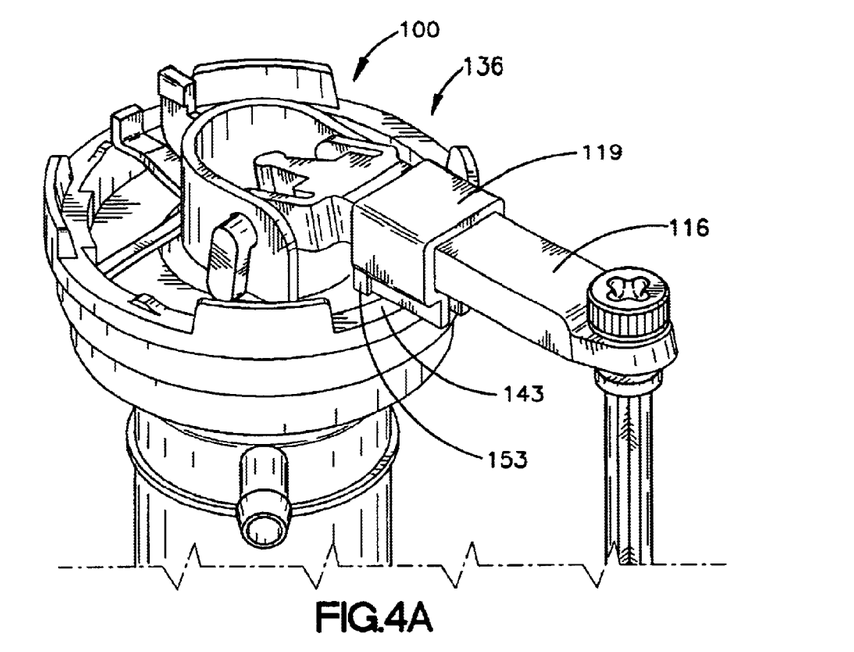
Figure 4B:
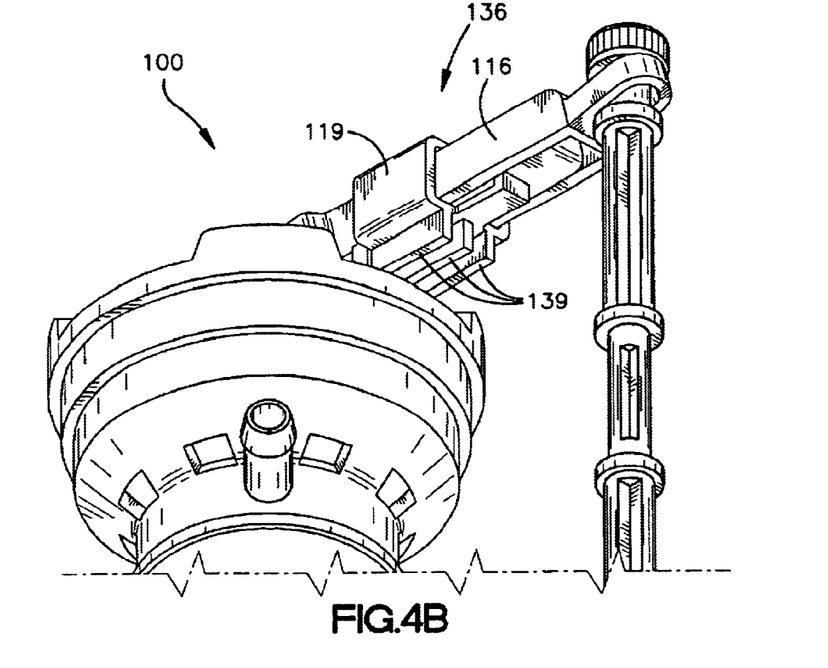

Referring next to FIGS. 4A and 4B, shown are additional views of a top portion of the toilet fill valve 100 according to embodiments of the present invention. In this respect, the toilet fill valve 100 as depicted in FIGS. 4A and 4B is in the closed position as was depicted with reference to the toilet fill valve 100 of FIG. 2B. As shown, the valve lock 119 is in the lock position 136, thereby holding the actuating arm 116 in the first position 133 such that the toilet fill valve 100 is closed. Consequently, water is prevented from flowing out of the water outlet 109 to fill the toilet tank. In addition, the retaining lip 153 is engaged with the rim 143 in that the retaining lip 153 butts up against the rim 143 to prevent the valve lock 119 from sliding down the length of the actuating arm 116 to the unlock position 149.

Figure 5A:
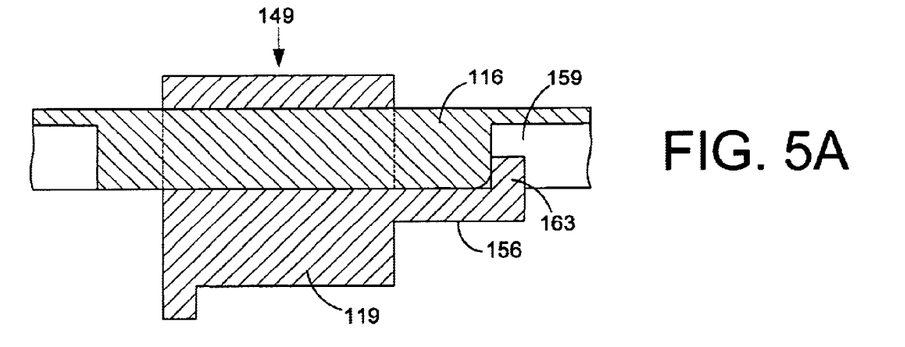
Figure 5B:
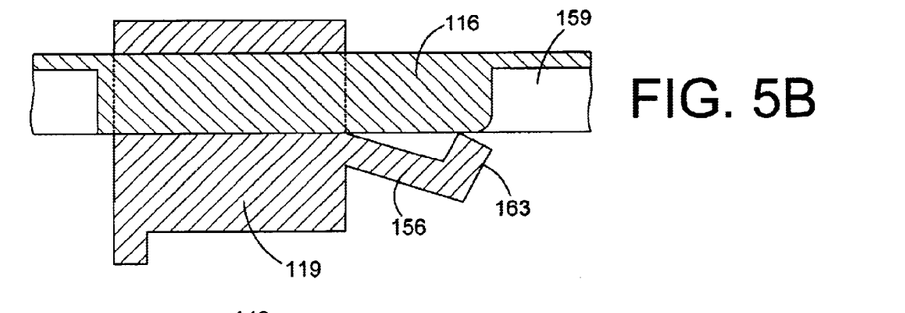

Referring next to FIGS. 5A and 5B, shown are side cut-out views of the actuating arm 116 and the valve lock 119 that illustrate how the valve lock 119 is retained in the unlock position 149 according to one embodiment of the present inventon. In this respect, the valve lock 119 includes a retaining clip 156 that engages a seat 159 in the actuating arm 116. Specifically, the actuating arm 116 includes the seat 159 and the retaining clip 156 includes a tooth 163 which falls into the seat 159, thereby holding the valve lock 119 in the unlock position 149. When the valve lock 119 is moved to the unlock position 149, the tooth 163 of the retaining clip 156 pops out of the seat 159 and allows the valve lock 119 to slide along the actuating arm 116.

Figure 6A:
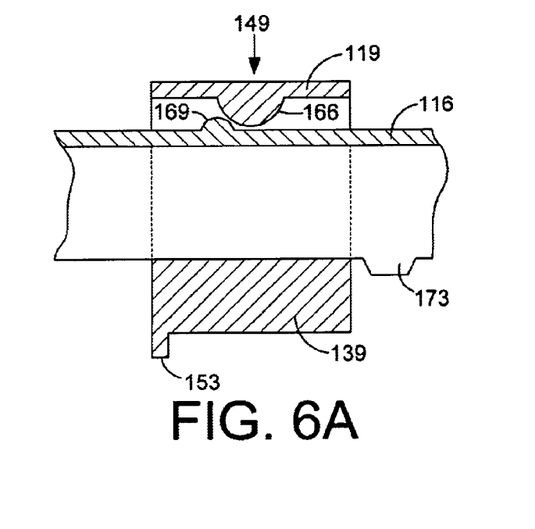
Figure 6B:
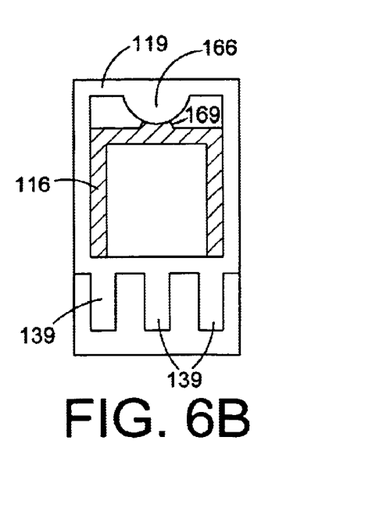

With reference to FIGS. 6A and 6B, shown is another side cut-out view of the actuating arm 116 with the valve lock 119 disposed thereon in the unlock position 149 according to an embodiment of the present invention. In this respect, the valve lock 119 includes a first retaining protrusion 166. The actuating arm 116 includes a second protrusion 169 that presents a slide resistance relative to the first retaining protrusion 166 of the valve lock 119, thereby holding the valve lock 119 in the unlock position 149 on the actuating arm 116. In this respect, the valve lock 119 may be slid across the length of the actuating arm 116 such that the first protrusion 166 engages and slides over the second protrusion 169, although with an amount of resistance is experienced. In this respect, a user would have to exert a certain amount of force on the valve lock 119 to allow the first protrusion to move past the second protrusion 169. When the valve lock 119 is placed in the unlock position, 149, it is retained in such position until a user exerts such force to move the valve lock 119 into the lock position 136 (FIG. 2B).

In addition, the actuating arm 116 includes an end stop 173 that prevents the valve lock 119 from falling off of the actuating arm 116 when the translating arm 126 (FIG. 1) is removed. In addition, FIGS. 6A and 6B also show the ribs that form the extended portion 139 of the valve lock 119 and the retaining lip 153 extending from the bottom of the extended portion 139 as shown.

The valve lock 119 described above provides one embodiment of the present invention that facilitates locking or holding the actuating arm 116 in the first position 133. In alternative embodiments, other configurations may be employed. For example, in one approach, a lock mechanism may be mounted on the body portion of the toilet fill valve 100 that hinges in a manner so as to but up against the actuating arm 116, holding the actuating arm 116 in the first position 133. Alternatively, a sliding mechanism or pivoting mechanism may be mounted on the toilet fill valve 100 that facilitates placing a mass between the bottom of the actuating arm 116 and the rim 143 or other structure of the toilet fill valve 100, thereby pinching such a mass in a manner that holds the actuating arm 116 in the first position 133. In all instances, such mechanisms may have a lock position and an unlock position.

In addition, the toilet fill valve 100 facilitates the performance of maintenance in such a manner that avoids the necessity of turning off the water supply to a toilet tank. For example, if an individual wishes to perform maintenance on a component in a toilet tank such as, for example, a leaky flapper or other component, then the user would wish to empty the toilet tank to perform such maintenance. Assuming that the toilet tank is full, then the actuating arm 116 is positioned in the first position 133 such that the toilet fill valve 100 is closed. The individual would then move the valve lock 119 from the unlock position 149 (FIG. 2A) to the lock position 136 (FIG. 2B), thereby fixing the actuating arm 116 in the first position 133. Next, the individual may flush the toilet to drain the toilet tank so as to be able to perform maintenance on the component in the toilet tank. Next the user performs such maintenance as is deemed necessary while the toilet tank is empty. The fact that the actuating arm 116 is held in the first position 133, thereby closing the toilet fill valve 100, allows the individual to perform maintenance without worrying about the toilet tank refilling with water. When the maintenance is finished and the individual wishes to refill the tank, the individual may then move the valve lock 119 from the lock position 136 to the unlock position 143, thereby allowing the toilet fill valve 100 to open and refill the toilet tank with water.

In still another method, an individual may perform the function of installing the toilet fill valve 100 in a toilet tank. In such a case, the water pressure at the inlet of the toilet tank would have to be turned off so that the valve may be replaced. Assuming that the shutoff valve dedicated to the toilet is malfunctioning, the individual would have to shut the water off at the main shutoff valve for the dwelling or other building. This may be problematic as when the water is turned back on, the newly installed toilet fill valve 100 is the first thing to call for water. Consequently, all of the rust and sediment in the pipes of the dwelling or other building that was loosened due to the change in pressure heads for the newly installed toilet fill valve 100. Such sediment and rust may foul the operation of the toilet fill valve 100, creating leaks and other problems.

To remedy this problem, a method is provided for establishing pressure at an inlet of a toilet fill valve 100 without directing the rust and sediment to thereto when water pressure is reestablished in a dwelling or other building after the toilet fill valve 100 is newly installed in a toilet tank. To begin, the individual positions the actuating arm 116 in the first position 133, thereby closing the toilet fill valve 100. This may be done by grasping the actuating arm 116 and holding it in the first position 133. Next, the valve lock 119 is moved into the lock position 136, thereby fixing the actuating arm 116 in the first position 136. Thereafter, the individual may establish water pressure at the inlet 106 of the toilet fill valve 100 while the valve lock 119 is in the lock position 136. This may be done, for example, by turning on a water main in the dwelling or other building. Since the toilet fill valve 100 is maintained in a closed state, it does not call for water immediately after pressure is reestablished. One may then turn on tub faucets and/or other valves in the dwelling or other building to flush all loosened rust and sediment from the pipes in the dwelling or other building. Thereafter, the individual may move the valve lock 119 into the unlock position 149 to open the toilet fill valve 100 to refill the toilet tank and to assume normal toilet operation.

Figure 7A:
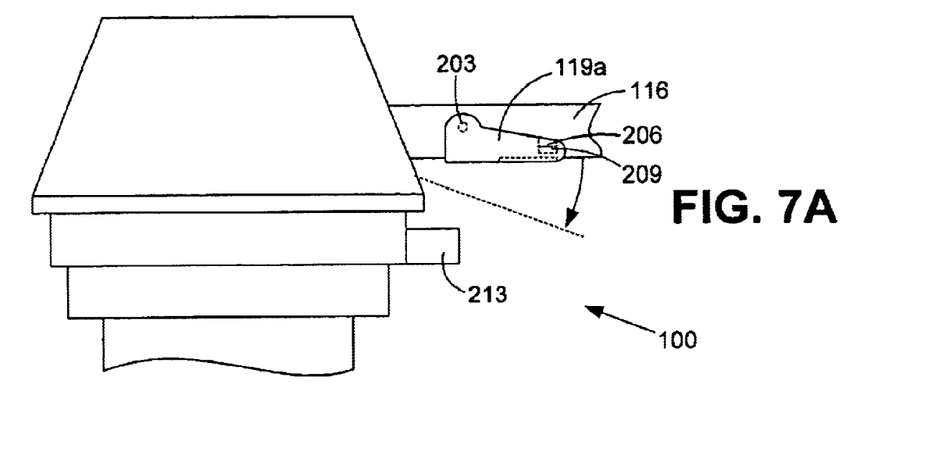
Figure 7B:
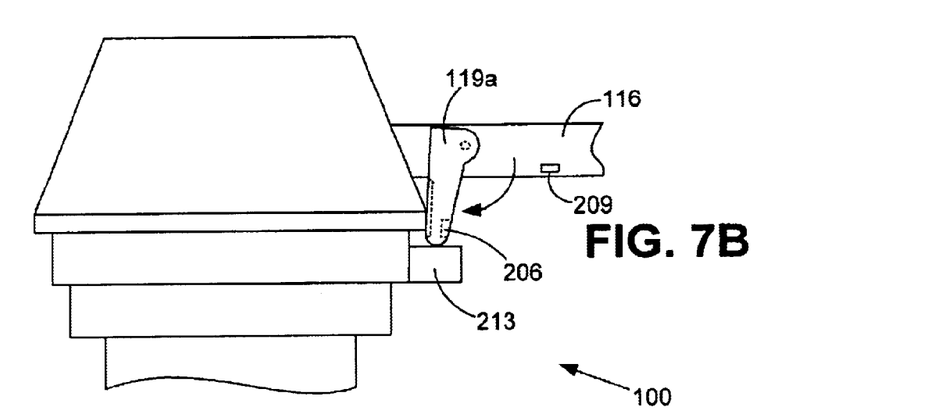
Figure 7C:
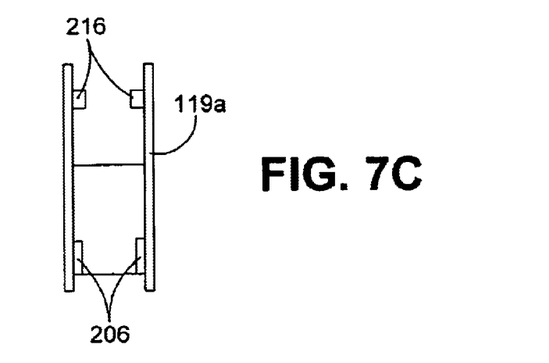

With reference to FIGS. 7A through 7C, shown are various views of a valve locking approach according to another embodiment of the present invention. In particular, the valve lock approach depicted in FIGS. 7A–7C employs a pivoting stand as will be described.

Specifically referring to FIG. 7A, shown is a top portion of the toilet fill valve 100 having the actuating arm 116. The actuating arm 116 pivots between the first position 133 and the second position 146 in a manner similar to that described above. In addition, a valve lock 119a is associated with the actuating arm 116. In particular, the valve lock 119a comprises a pivoting stand that is pivotally attached to the actuating arm 116 about a pivot point 203. The valve lock 119a depicted in FIG. 7A is shown an unlocked position such that a retaining protrusion 206 associated with the valve lock 119a engages a corresponding retaining protrusion 209. Alternatively, there may be a pair of retaining protrusions 206 that engage a corresponding number of retaining protrusions 209 on the actuating arm 116. In addition, extending from the body of the toilet fill valve 100 is a shelf 213. The shelf engages the valve lock 119a when it is placed in the lock position as will be described.

With reference to FIG. 7B, shown is the upper portion of the toilet fill valve 100 in which the valve lock 119a is in the lock position. In this respect, a free end of the valve lock 119a rests against the shelf 213, thereby holding the actuating arm 116 in the first position 133, thereby maintaining the toilet fill valve 100 in a closed state to prevent water from refilling in a respective toilet tank. The valve lock 119a rotates just over 90 degrees from the unlock position to the lock position. In this manner, the valve lock 119a is held in the lock position due to the force exerted downward by the actuating arm 116 as should be apparent.

With reference to FIG. 7C, shown is a top view of the valve lock 119a according to an embodiment of the present invention. Specifically, the valve lock includes the retaining protrusions 206 that engage the corresponding retaining protrusions 209 on the actuating arm 116 (FIG. 7B) in order to hold the valve lock 119a in the unlock position. In addition, the valve lock 119a includes pegs 216 that fit into corresponding holes in the actuating arm 116 to facilitate the pivoting of the valve lock 119a about the pivot point 203 as described above.

To describe the operation of the valve lock 119a as depicted in FIGS. 7A–7C, first, a user would grasp the valve lock 119a when the actuating arm 116 is in the first position 133 and manipulate a free end of the valve lock 119a so that it pivots about the pivot point 203 until the valve lock 119a comes to rest against the shelf 213. In this respect, the valve lock 119a is thus pinched between the shelf 213 and the actuating arm 116, thereby preventing the actuating arm 116 from dropping which correspondingly prevents the toilet fill valve 100 from opening to fill a respective toilet tank with water. To disengage the valve lock 119a, a user need only manipulate the free end of the valve lock 119a to pivot back up to the unlock position as depicted with respect to FIG. 7A.

Figure 8A:
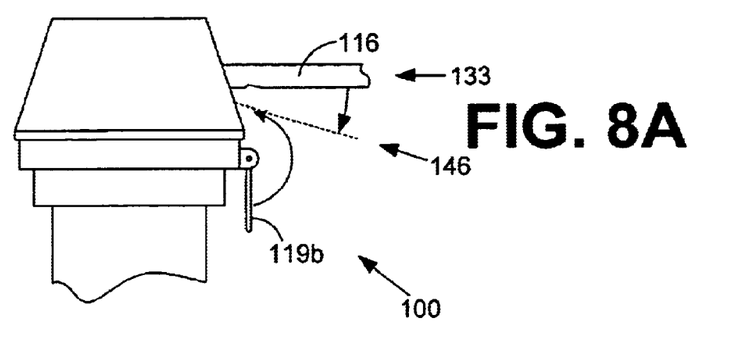
Figure 8B:
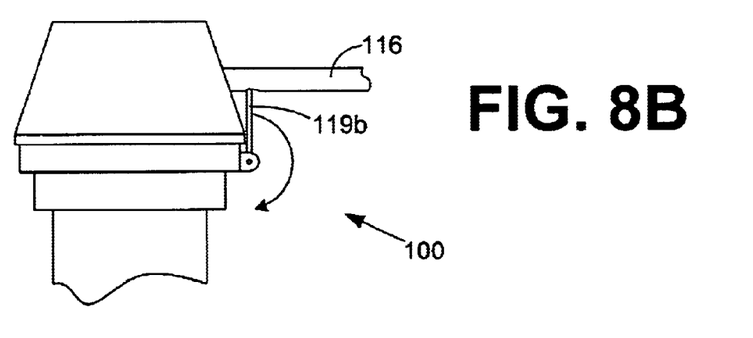

Referring next to FIGS. 8A through 8C, shown is a valve lock according to another embodiment of the present invention. With reference to FIGS. 8A and 8B, shown is an upper portion of a toilet fill valve 100 that includes a valve lock 119b. The valve lock 119b is a pivoting stand with one end that is pivotally attached to a body of the toilet fill valve 100 as shown. As depicted in FIG. 8A, the valve lock 119b is in the unlock position, thereby allowing the actuating arm 116 to move from a first position 133 in which the toilet fill valve 100 is in a dosed state, to a second position 146 in which the toilet fill valve 100 is in an open state as discussed above. The valve lock 119b may be moved or pivoted from the unlock position to a lock position as depicted with respect to FIG. 8B. In this respect, a free end of the valve lock 119 rests in a divot against an underside of the actuating arm 116 when the valve lock 119b is in the lock position as shown. In this respect, the actuating arm 116 is thus fixed in the first position, thereby maintaining the toilet fill valve 100 in a closed state. The operation of the valve lock 119b is similar to the operation of the valve lock 119a described above.

Figure 8C:
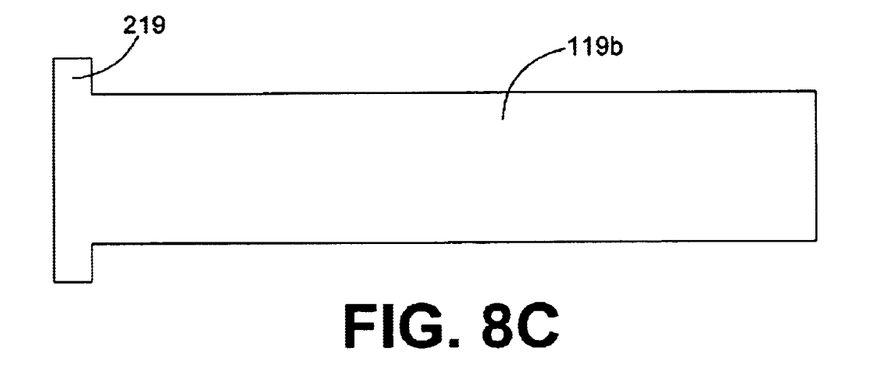

With reference to FIG. 8C, shown is a top view of the valve lock 119b that includes pegs 219 that mate with holes in an extended portion from the body of the toilet fill valve 100 to facilitate the pivoting of the valve lock 119b as described above.

In an additional alternative, the valve lock may comprise a foreign object that is wedged beneath the actuating arm 116 that maintains the actuating arm 116 in the first position 133. In this respect, such valve lock is in the lock position when it is wedged beneath the actuating arm 116, and it is in the unlock position when not places as such. Such a valve lock is associated with the actuating arm 116 in that it is compatible with the structure of the actuating arm 116 such that it stays in the lock position when so placed.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A lockable toilet fill valve, comprising:

a toilet fill valve with an actuating arm;

the toilet fill valve being dosed when the actuating arm is disposed in a first position;

the toilet fill valve being open when the actuating arm is disposed in a second position;

a valve lock associated with the actuating arm and a portion of the toilet fill valve, the valve lock includes an unlock position and a lock position, wherein the valve lock fixes the actuating arm in the first position and engages both the actuating arm and the portion of the toilet fill valve when the valve lock is in the lock position; and the valve lock being configured to be moved manually from the lock position to the unlock position independent of a flush operation of a toilet, wherein the valve lock is out of engagement with at least one of the portion of the toilet fill valve and the actuating arm in the unlock position.

2. The lockable toilet fill valve of claim 1, wherein the valve lock further comprises a pivoting stand pivotally coupled to a body portion of the toilet fill valve.

3. The lockable toilet fill valve of claim 1, further comprising a float operatively coupled to a free end of the actuating arm.

4. The lockable toilet fill valve of claim 1, further comprising:

a retaining lip on the valve lock; and a rim at a top of the toilet fill valve, wherein the retaining lip of the valve lock engages the rim when the valve lock is in the lock position.

5. The lockable toilet fill valve of claim 1, wherein:

the valve lock includes a retaining clip; and the actuating arm includes a retaining structure that is compatible with the retaining clip, the retaining clip engaging the retaining structure to hold the valve lock in the unlock position on the actuating arm.

6. The lockable toilet fill valve of claim 1, wherein the valve lock is configured to slide along the actuating arm from the unlock position to the lock position.

7. A The lockable toilet fill valve, comprising:

a toilet fill valve with an actuating arm;

the toilet fill valve being dosed when the actuating arm is disposed in a first position;

the toilet fill valve being open when the actuating arm is disposed in a second position; and a valve lock associated with the actuating arm, the valve lock including an unlock position and a lock position, wherein the valve lock fixes the actuating arm in the first position when the valve lock is in the lock position, and wherein the valve lock is connected to the actuating arm, the valve lock sliding along the actuating arm from the unlock position to the lock position, and the valve lock engaging a portion of the toilet fill valve and the actuating arm when in the lock position.

8. The lockable toilet fill valve of claim 7, further comprising:

a retaining lip on the valve lock; and wherein the portion of the toilet fill valve further comprises a rim at a top of the toilet fill valve and the valve lock engages the rim.

9. The lockable toilet fill valve of claim 8, wherein the valve lock further comprises a retaining lip that butts up against the rim when the valve lock is in the lock position.

10. A lockable toilet fill valve, comprising:

a toilet fill valve with an actuating arm;

the toilet fill valve being closed when the actuating arm is disposed in a first position;

the toilet fill valve being open when the actuating arm is disposed in a second position;

a valve lock associated with the actuating arm, the valve lock including an unlock position and a lock position, wherein the valve lock fixes the actuating arm in the first position when the valve lock is in the lock position; and the valve lock further comprising a pivoting stand pivotally coupled to the actuating arm and the valve lock engaging a portion of the toilet fill valve and the actuating arm when in the lock position.

11. The lockable toilet fill valve of claim 10, wherein the portion of the toilet fill valve further comprises a shelf extending from a body of the toilet fill valve.

12. A lockable toilet fill valve, comprising:
a toilet fill valve with an actuating arm;
the toilet fill valve being closed when the actuating arm is disposed in a first position;
the toilet fill valve being open when the actuating arm is disposed in a second position;
a valve lock associated with the actuating arm, the valve lock including an unlock position and a lock position, wherein the valve lock fixes the actuating arm in the first position when the valve lock is in the lock position; and
the valve lock further comprising a pivoting stand pivotally coupled to a body portion of the toilet fill valve, wherein a free end of the pivoting stand rests against the actuating arm in a divot on the actuating arm when the pivoting stand is in the lock position.

13. A lockable toilet fill valve, comprising:
a toilet fill valve with an actuating arm;
the toilet fill valve being closed when the actuating arm is disposed in a first position;
the toilet fill valve being open when the actuating arm is disposed in a second position;
a valve lock associated with the actuating arm, the valve lock includes an unlock position and a lock position, wherein the valve lock fixes the actuating arm in the first position when the valve lock is in the lock position; and
a cap over a top of the toilet fill valve, the cap having an opening through which the actuating arm extends, wherein at least a portion of the valve lock extends through the opening when in the lock position.

14. A lockable toilet fill valve, comprising:
a toilet fill valve with an actuating arm;
the toilet fill valve being closed when the actuating arm is disposed in a first position;
the toilet fill valve being open when the actuating arm is disposed in a second position;
a valve lock associated with the actuating arm, the valve lock includes an unlock position and a lock position, wherein the valve lock fixes the actuating arm in the first position when the valve lock is in the lock position;
wherein the valve lock includes a retaining structure; and
the actuating arm includes a retaining protrusion, the retaining protrusion presents a slide resistance to the movement of the valve lock along the actuating arm, thereby holding the valve lock in the unlock position on the actuating arm.

15. A method for establishing a water pressure at an inlet of a toilet fill valve in a toilet tank of a toilet, the toilet fill valve including an actuating arm with a valve lock, the valve lock moving from an unlock position and a lock position, the method comprising the steps of:
moving the valve lock into the lock position independent of a flush operation of the toilet while the actuating arm is in a first position, thereby fixing the actuating arm in the first position, where the toilet fill valve is closed when the actuating arm is in the first position and the valve lock engages both a portion of the toilet fill valve and the actuating arm when in the lock position;
establishing the water pressure at the inlet of the toilet fill valve while the valve lock is in the lock position; and
moving the valve lock into the unlock position independent of a flush operation of the toilet after the water pressure has been established at the inlet of the toilet fill valve, wherein the valve lock is out of engagement with at least one of the portion of the toilet fill valve and the actuating arm in the unlock position.

16. A method for locking a toilet fill valve for the performance of maintenance to a component in a toilet tank of a toilet, wherein the toilet fill valve includes an actuating arm and a valve lock, the valve lock having an unlock position and a lock position, the method comprising the steps of:
positioning the actuating arm in a first position, where the toilet fill valve is closed when the actuating arm is in the first position;
placing the valve lock into the lock position independent of a flush operation of the toilet, thereby fixing the actuating arm in the first positions wherein the valve lock engages both a portion of the toilet fill valve and the actuating arm in the lock position;
draining the toilet tank to perform maintenance on the component in the toilet tank; and
moving the valve lock from the lock position to the unlock position independent of a flush operation of the toilet when the maintenance is finished, thereby allowing the toilet fill valve to open and refill the toilet tank with an amount of water, wherein the valve lock is out of engagement with at least one of the portion of the toilet fill valve and the actuating arm in the unlock position.

* * * * *

UNITED STATES PATENT AND TRADEMARK OFFICE
CERTIFICATE OF CORRECTION

PATENT NO. : 6,837,264 B1
DATED : January 4, 2005
INVENTOR(S) : Michael J. Schuster It is certified that error appears in the above-identified patent and that said Letters Patent is hereby corrected as shown below:

Column 8,
Lines 27-42, please replace claim 7 as follows:
-- 7. A lockable toilet fill valve, comprising:
    a toilet fill valve with an actuating arm;
    the toilet fill valve being closed when the actuating arm is disposed in a first position;
    the toilet fill valve being open when the actuating arm is disposed in a second position; and
    a valve lock associated with the actuating arm, the valve lock including an unlock position and a lock position, wherein the valve lock fixes the actuating arm in the first position when the valve lock is in the lock position, and wherein the valve lock is connected to the actuating arm, the valve lock sliding along the actuating arm from the unlock position to the lock position, and the valve lock engaging a portion of the toilet fill valve and the actuating arm when in the lock position. --.

Signed and Sealed this

Twenty-seventh Day of September, 2005

JON W. DUDAS
*Director of the United States Patent and Trademark Office*